United States Patent [19]

Jan

[11] Patent Number: 5,466,299
[45] Date of Patent: Nov. 14, 1995

[54] METHOD FOR REMOVING A CONTAMINANT FROM A CONTAMINATED SURFACE SOIL

[75] Inventor: Raymond J. Jan, Dallas, Tex.

[73] Assignee: Mobil Oil Corporation, Fairfax, Va.

[21] Appl. No.: 236,817

[22] Filed: May 2, 1994

[51] Int. Cl.⁶ ............................ B08B 3/00; B08B 5/04
[52] U.S. Cl. ..................... 134/21; 134/25.1; 134/10; 134/26
[58] Field of Search ................ 134/21, 10, 25.1, 134/26

[56] References Cited

U.S. PATENT DOCUMENTS

| | | | |
|---|---|---|---|
| 4,073,030 | 2/1978 | Albishausen | 134/21 |
| 4,109,897 | 8/1978 | Mehrkam | 266/120 |
| 4,402,760 | 9/1983 | Strong | 134/10 |

*Primary Examiner*—Jan H. Silbaugh
*Assistant Examiner*—Zeinab El-Arini
*Attorney, Agent, or Firm*—A. J. McKillop; George W. Hager, Jr.

[57] ABSTRACT

Contaminants are removed from a contaminated surface soil by contacting the soil with a solvent in which the contaminate is soluble and then vacuuming the solvent with the contaminants dissolved therein from the soil.

5 Claims, 1 Drawing Sheet

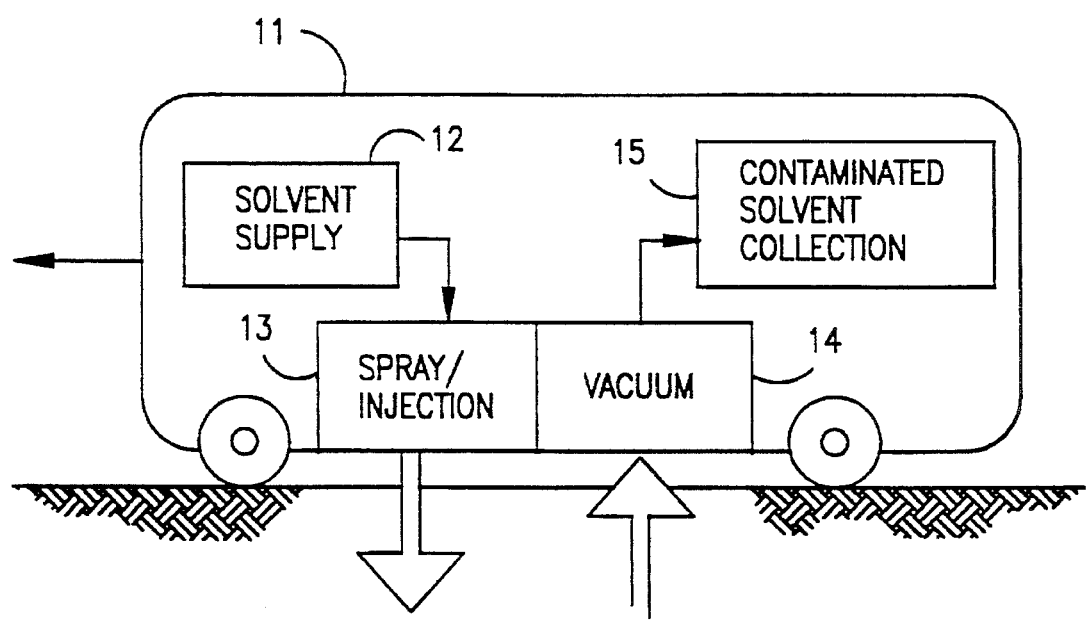

METHOD FOR REMOVING A CONTAMINANT FROM A CONTAMINATED SURFACE SOIL

BACKGROUND OF THE INVENTION

Hydrocarbon production operations often involve the handling of high saline water recovered from a subsurface oil or gas reservoir along with the oil or gas. Typically such saline water is separated from the particular hydrocarbon and disposed of by surface ponding or by reinjection into the formation. With surface disposal, the soil will become contaminated with salt and/or other materials and rendered unsuitable for plants and vegetation. With subsurface disposal, piping leaks, breaks or operational upsets at the surface could cause the surface soil to become contaminated by the saline water.

Current technologies available for the treatment of surface soils contaminated with organic or inorganic pollutants can be classified as in-situ and ex-situ techniques. In the in-situ process, solvent is sprayed on the surface of the contaminated soil. The solvent, after contacting the soil and dissolving the organic or inorganic materials, is collected via a pump or perforated pipe located below the soil's surface. In the ex-situ process, the contaminated soil is excavated and moved to a central location where soil is performed.

SUMMARY OF THE INVENTION

In accordance with the present invention there is provided a method for removing a contaminant from a surface formation by contacting the surface formation with a solvent in which the contaminant is soluble and then vacuuming the solvent with the contaminant dissolved therein from the surface formation. The solvent may be sprayed onto the surface of the formation or injected into the formation. The method may be enhanced by increasing the permeability of the formation to the solvent prior to the solvent contacting treatment. Such contacting, vacuuming and permeability enhancing steps may be repeated as necessary to provide a desired degree of contaminant removal.

In a further aspect, the contaminant may be separated from the contaminant-saturated solvent vacuumed from the surface formation to recover the solvent for use in further treatments of the formation.

BRIEF DESCRIPTION OF THE DRAWING

The sole figure is a pictorial illustration of the carrying out of the soil contamination removal steps of the present invention.

DESCRIPTION OF THE PREFERRED EMBODIMENT

Referring to the drawing, there is illustrated a surface formation 10 containing a contaminate that is to be removed. A soil washing machine 11 is moved into position above the formation 10. A solvent in which the contaminate is soluble is contained within a solvent supply 12. For example, should formation 10 have been used as a depository of high saline water such as might have been recovered from hydrocarbon production operations, the solvent in supply 12 would preferably be clean water. Using this as one example in describing the present invention, the clean water from supply 11 is applied by the spray or injection means 13 to the surface of formation 10.

After the elapse of a predetermined time period during which the water reacts with and dissolves the salt deposited within the formation 10, a vacuum means 14 is operated to remove the salt-containing water from the formation for collection in the contaminated solvent container 15. Each soil washing treatment may be repeated as many times as required until the soil becomes suitable for agriculture or other intended uses.

The time period for each soil washing treatment will vary in accordance with the contaminate to be removed and the solvent to be used in the treatment. For the above described example of washing the soil with water to remove salt contaminates, an effective soak period would be in the order of less than a minute before vacuuming. Surfactants or other additives may be added to the solvent to enhance the removal of salt or other contaminants, such as organic hydrocarbons.

Efficiency of the contaminate removal during the soil washing treatment can be further improved by heating the particular solvent prior to spraying or injection into the formation so as to increase its reaction with the particular contaminate to be removed. The soil washing treatment may further be improved by increasing formation permeability either before or during the treatment. For example, the formation may be treated with a suitable additive, such as calcium chloride. Also the formation might be plowed and leveled prior to treatment.

After vacuuming the contaminate-saturated solvent from the formation, the contaminate may be separated from the solvent so that the solvent may be used in further formation treatments.

While the foregoing preferred embodiment of the present invention has been described and illustrated, numerous modifications or alterations maybe made without departing from the spirit and scope of the invention as set forth in the appended claims.

What is claimed is:

1. A method for removing a contaminant from a contaminated surface soil, comprising the steps of:
   a) treating said contaminated surface soil to increase permeability of said soil by contacting with an additive or by plowing and leveling said soil;
   b) contacting said contaminated surface soil with a solvent in which said contaminant is soluble; and
   c) vacuuming said solvent with said contaminant dissolved therein from said contaminated surface soil.

2. The method of claim 1 wherein said contaminant is salt.

3. The method of claim 2 wherein said solvent is clean water.

4. The method of claim 1 further comprising the step of heating said solvent prior to its contacting said contaminated surface soil in step b).

5. The method of claim 1 wherein said additive is calcium chloride.

\* \* \* \* \*